United States Patent
Nozaki et al.

(10) Patent No.: US 6,248,820 B1
(45) Date of Patent: Jun. 19, 2001

(54) FLAME RETARDANT FOR MESH SHEETS AND FLAMEPROOF MESH SHEET COMPRISING THE SAME

(75) Inventors: Saiji Nozaki, Toyama; Kuniaki Kamiya, Osaka, both of (JP)

(73) Assignee: Kyowa KabushikiKaisha, Osaka (JP)

( * ) Notice: Subject to any disclaimer, the term of this patent is extended or adjusted under 35 U.S.C. 154(b) by 0 days.

(21) Appl. No.: 09/168,687

(22) Filed: Oct. 9, 1998

(30) Foreign Application Priority Data

Oct. 9, 1997 (JP) .................................................... 9-312550

(51) Int. Cl.$^7$ .............................. C08K 3/02; C08K 5/521
(52) U.S. Cl. ........................ 524/414; 524/416; 524/503; 524/507; 524/707; 523/179; 523/333; 523/334; 526/329.5; 525/127; 252/609; 252/606
(58) Field of Search ................................. 252/609, 606; 523/179, 210, 333, 334; 525/10, 30, 127; 524/416, 414, 503, 507, 707; 526/329.5

(56) References Cited

U.S. PATENT DOCUMENTS

| | | | |
|---|---|---|---|
| 3,982,410 | * | 9/1976 | Getchell et al. . |
| 4,423,103 | * | 12/1983 | Bogdany ................. 428/95 |
| 4,762,750 | * | 8/1988 | Girgis et al. ............ 428/378 |
| 4,762,751 | * | 8/1988 | Girgis et al. ............ 428/378 |
| 4,877,823 | * | 10/1989 | Plachetta et al. .......... 524/80 |
| 5,279,878 | * | 1/1994 | Fottinger et al. .......... 428/102 |
| 5,286,576 | * | 2/1994 | Srail et al. ............... 428/517 |
| 5,486,398 | * | 1/1996 | Weber et al. .............. 428/95 |
| 5,501,879 | * | 3/1996 | Murayama .............. 427/381 |
| 6,150,448 | * | 11/2000 | Nozaki et al. ............ 524/414 |

FOREIGN PATENT DOCUMENTS

| | | |
|---|---|---|
| 505 940 | 3/1992 | (EP) . |
| 546 841 | 6/1993 | (EP) . |
| 61-9430 | 3/1986 | (JP) . |
| 61-223045 | 10/1986 | (JP) . |

OTHER PUBLICATIONS

English Abstract of JP 61–223045, "Fire retardant polyolefin composition comprises polyolefin, red phosphorus and ammonium phosphate" (03/86).

Atsushi Kanayama et al., "Recent trend on Red Phosphorus Group Flame Retardant," Japan Plastics, vol. 42, No., 2, pp. 74–80 (Feb., 1991).

* cited by examiner

Primary Examiner—Joseph D. Anthony
(74) Attorney, Agent, or Firm—Rader, Fishman & Grauer, PLLC

(57) ABSTRACT

A flame retardant for flameproof mesh sheets which does not experience an increase in viscosity while it is kept and does not generate harmful halogen gas at the time of combustion and a flameproof mesh sheet comprising the same. The flame retardant for mesh sheets preferably comprises red phosphorus in an amount of 1.5 to 15 parts by weight and an ammonium polyphosphate compound in an amount of 10 to 70 parts by weight based on 100 parts by weight of an aqueous dispersion of an ethylene-vinyl acetate copolymer having a vinyl acetate content of 10 to 95 wt % and a resin solid content of 25 to 75 wt %.

8 Claims, No Drawings

FLAME RETARDANT FOR MESH SHEETS AND FLAMEPROOF MESH SHEET COMPRISING THE SAME

BACKGROUND OF THE INVENTION

1. Field of the Invention

The present invention relates to a halogen-free flameproof mesh sheet used outdoors such as at a construction site, and in particular to flameproof mesh sheets capable of being used for a long time.

2. Description of Related Art

In recent years, there has been a trend toward the construction of buildings having a large number of stories in the construction industry. Meanwhile, there has also been an increase in the number of houses having a relatively small number of stories. There has recently been an increase in the need for flameproof mesh sheets, for example for safety and protection in houses having a small number of stories and also for scattering prevention. Due to these and other factors, flameproof mesh sheets must be laid in these buildings. Further, regulations are becoming more and more strict regarding their use.

Currently used flameproof mesh sheets and scattering prevention flameproof mesh sheets are generally produced by weaving yarn prepared by coating a polyester, nylon or polypropylene multi-filament fiber with a vinyl chloride-based paste resin composition and heating, and then heating the obtained cloth. In addition, they can be prepared by coating a fabric prepared by weaving and processing a multi-filament fiber with a vinyl chloride-based paste resin composition, heating and processing to a desired shape.

An exemplary resin composition for coating a fiber and fabric comprises a vinyl chloride resin containing chlorine as a resin and a chlorine-based flame retardant such as chlorinated paraffin, bromine-based flame retardant such as decabromodiphenyl oxide or an inorganic flame retardant such as antimony trioxide (see, for example, Examined Japanese Patent Publication Nos. 52-41786, 53-18065 and 61-94305, Plastics, February, 1991 which is incorporated herein in its entirety by reference).

In recent years, it has been demanded globally to avoid the use of resins and flame retardants containing elemental halogen which generate harmful gas at the time of combustion from the viewpoint of the environmental preservation of the earth.

Japanese Laid-open Patent Application No. 61-223045 proposes that red phosphorus and ammonium phosphate can be kneaded into a polyolefin to prevent corrosion by elemental halogen contained in an elemental halogen-containing compound flame retardant. However, a flame retardant prepared by dispersing red phosphorus and ammonium phosphate in an aqueous dispersion of an ethylene-vinyl acetate copolymer or an aqueous dispersion comprising the aqueous dispersion and an aqueous dispersion of an α-olefin copolymer and/or an aqueous dispersion of a polyurethane was not known at the time of the present invention.

The inventor of the present invention has proposed in Japanese Laid-open Patent Application No. 9-225464 which is incorporated herein by reference in its entirety a halogen-free flame retardant comprising an aqueous dispersion of a polyolefin resin as a flame retardant. This flame retardant has an excellent effect but it has a tendency to increase in viscosity over time during storage.

SUMMARY OF THE INVENTION

In view of the above situation, it is an object of the present invention to provide a flame retardant for halogen-free flameproof mesh sheets which does not generate harmful halogen gas at the time of combustion and does not experience an increase in viscosity during storage, and a flameproof mesh sheet comprising the same.

In accordance with these and other objects, there is provided claim 1 a flame retardant for mesh sheets comprising red phosphorus in an amount of 1.5 to 15 parts by weight and an ammonium polyphosphate compound in an amount of 10 to 70 parts by weight based on 100 parts by weight of the solid content of an aqueous dispersion of an ethylene-vinyl acetate copolymer having a vinyl acetate content of 10 to 95 wt % and a resin solid content of 25 to 75 wt %.

Other objects, advantages and features will become apparent from the following detailed description which follows.

DETAILED DESCRIPTION OF THE PREFERRED EMBODIMENT

The present invention relates to a flame retardant for mesh sheets comprising red phosphorus in an amount of 1.5 to 15 parts by weight and an ammonium polyphosphate compound in an amount of 10 to 70 parts by weight based on 100 parts by weight of the solid content of an aqueous dispersion of an ethylene-vinyl acetate copolymer having a vinyl acetate content of 10 to 95 wt % and a resin solid content of 25 to 75 wt %.

The flame retardant for mesh sheets can be prepared for example, by mixing an aqueous dispersion of an α-olefin copolymer preferably having a solid content of 20 to 45 wt % with an aqueous dispersion of an ethylene-vinyl acetate copolymer preferably having a vinyl acetate content of 10 to 95 wt % and a resin solid content of 25 to 75 wt % in a solid content weight ratio preferably of 10:90 to 70:30 and adding red phosphorus preferably in an amount of 1.5 to 15 parts by weight and an ammonium polyphosphate compound preferably in an amount of 10 to 70 parts by weight based on 100 parts by weight of the total resin solid content.

The flame retardant for mesh sheets can also be prepared alternatively, for example, by mixing an aqueous dispersion of a polyurethane preferably having a solid content of 25 to 70 wt % with an aqueous dispersion of an ethylene-vinyl acetate copolymer preferably having a vinyl acetate content of 10 to 95 wt % and a resin solid content of 25 to 75 wt % in a solid content weight ratio preferably of 10:90 to 90:10 and adding red phosphorus in an amount of preferably 1.5 to 15 parts by weight and an ammonium polyphosphate compound preferably in an amount of 10 to 70 parts by weight based on 100 parts by weight of the total resin solid content.

The flame retardant for mesh sheets can also further be prepared by mixing an aqueous dispersion of an α-olefin copolymer preferably having a solid content of 20 to 45 wt % and an aqueous dispersion of a polyurethane preferably having a solid content of 25 to 70 wt % with an aqueous dispersion of an ethylene-vinyl acetate copolymer preferably having a vinyl acetate content of 10 to 95 wt % and a resin solid content of 25 to 75 wt % in a solid content weight ratio of preferably 10:10:80 to 50:80:10 and adding red phosphorus preferably in an amount of 1.5 to 5 parts by weight and an ammonium polyphosphate compound preferably in an amount of 10 to 70 parts by weight based on 100 parts by weight of the total resin solid content. The red phosphorus, and/or the ammonium phosphate compound can be micro-capsulated if desired.

Optionally, the flame retardant for mesh sheets prepared by also mixing a metal hydroxide in an amount preferably of 60 to 150 parts by weight based on 100 parts by weight of the solid content of the aqueous dispersion resin of the flame retardant for mesh sheets as described above. The metal hydroxide can expediently be magnesium hydroxide and/or aluminum hydroxide.

The flame retardant can be used, for example, to impregnate flameproof mesh sheets woven out of coated yarn which are then heated. The flameproof mesh sheets can comprise a multi-filament fiber that preferably has an equivalent single fineness of 3 to 17 denier, a total fineness of 1,000 to 4,500 denier, a tensile strength of 6 to 10 g/denier and break strength of 14 to 45%. The flameproof mesh sheets can be prepared for example by impregnating a mesh sheet fabric woven out of multi-filament fibers with the flame retardant for mesh sheets and heating. The mesh sheet fabric can be woven out of multi-filament fibers and can compose a mesh sheet fabric that is prepared for example by paralleling 1 to 4 synthetic fibers preferably having an equivalent single fineness of 2 to 13 denier, a total fineness of 150 to 2,500 denier, a tensile strength of 6 to 10 g/denier and a break strength of 14 to 45% and leno weaving them with a weaving machine. The fabric can advantageously have a mesh length of 10 to 140 warps/10 cm and 10 to 140 wefts/10 cm. The amount of the flame retardant for mesh sheets used to impregnate multi-filament fibers or a mesh sheet fabric woven out of the multi-filament fibers can preferably be from 60 to 250 parts by weight based on 100 parts by weight of the multi-filament fibers or the mesh sheet fabric.

DETAILED DESCRIPTION OF THE PREFERRED EMBODIMENT

An aqueous dispersion of an ethylene-vinyl acetate copolymer is preferably used as a base material in the present invention inter alia because a multi-filament fiber and fabric can be fully impregnated with a flame retardant and uniformly coated with the flame retardant. The aqueous dispersion makes impregnation and coating relatively easy.

The ethylene-vinyl acetate copolymer used in the present invention advantageously comprises 10 to 95 wt % of vinyl acetate and the aqueous dispersion of the ethylene-vinyl acetate copolymer preferably has a solid content of 27 to 75 wt %, a particle diameter of 0.1 to 15 $\mu$m, a viscosity of 50 to 9,000 cp and a pH of 4 to 9, as exemplified by V-200 and V-100 (of Mitsui Petrochemical Industries, Ltd.), S-301, S-500, 5-706, S751, S752 and S753 (of Sumitomo Chemical Company, Ltd.), the standards and specifications of which are incorporated herein by reference.

Since the ethylene-vinyl acetate copolymer has a group represented by —OCO—$CH_3$ and a large amount of oxygen, its flame retarding effect may be particularly large when it is used in combination with red phosphorus and ammonium polyphosphate.

In the present invention, an $\alpha$-olefin copolymer can be used in combination with this aqueous dispersion of the ethylene-vinyl acetate copolymer, and a dispersion of the $\alpha$-olefin copolymer preferably has a solid content of 20 to 45 wt %, a particle diameter of 1 to 10 $\mu$m, a pH of 8 to 11, a viscosity of 2,000 to 8,000 cp (a BM type viscometer, 6 rotations) and a resin surface hardness of A-80 to 97 (Shore A: ASTMD). The $\alpha$-olefin copolymer is preferably a thermoplastic elastomer resin containing ethylene in an amount of 50 wt % or more, such as A-100 or A-200 (Mitsui Petrochemical Industries, Ltd.).

The aqueous dispersion of the ethylene-vinyl acetate copolymer is excellent in flame retarding effect and keeping or storage quality, having only a small rise or increase in viscosity due to time changes, but the feeling of a mesh sheet treated with this dispersion is slightly hard.

When an aqueous dispersion of an $\alpha$-olefin copolymer is used in combination with the above dispersion to improve the hardness, the feeling of the mesh sheet becomes softer. The amount of the $\alpha$-olefin copolymer if added, is preferably 10 to 70 wt % based on 90 to 30 wt % of the solid content of the ethylene-vinyl acetate copolymer. When the amount is smaller than about 10 wt %, the improvement of the feeling may be small and when the amount is larger than about 70 wt %, flameproofness may deteriorate disadvantageously.

When the polyurethane aqueous dispersion is further used together to improve the feeling, the feeling becomes softer and the gloss becomes satisfactory most advantageously. The amount of the polyurethane if included is preferably 10 to 90 wt % based on 90 to 10 wt % of the solid content of the ethylene-vinyl acetate copolymer. When the amount is smaller than about 10 wt %, the improvements of feeling and gloss may be small and when the amount is larger than about 90 wt %, flameproofness may tend to deteriorate disadvantageously.

A polyurethane having the main structure of a polyester, polyol or polycarbonate is preferably used as the polyurethane. Out of these, a polyurethane having the main structure of a polyester is generally preferred from the viewpoint of flexibility, water resistance, adhesion and the like.

The polyurethane aqueous dispersion used in the present invention preferably has a solid content of 25 to 70 wt %, a particle diameter of 0.01 to 10 $\mu$m, a viscosity of 10 to 3,000 cp and a pH of 4 to 9, as exemplified by Despacol U-42 and Despacol KA8481 of Sumitomo Viel Urethane Co, Adecabontiter HUX-380, Adecabontiter HUX-232, Adecabontiter HUX-290H, Adecabontiter HUX-350 and Adecabontiter HUX-386H of Asahi Denka Kogyo Co., Letan WB of Kansai Paint Co., and the like, the specifications of which are incorporated herein by reference.

The present invention preferably contains a flame retardant comprising an aqueous solution of an ethylene-vinyl acetate copolymer, an aqueous dispersion of an $\alpha$-olefin copolymer and an aqueous dispersion of a polyurethane. As for the amounts of the $\alpha$-olefin copolymer and the polyurethane, if they are used, the $\alpha$-olefin copolymer is preferably used in an amount of 10 to 50 wt % and the polyurethane is preferably used in an amount of 10 to 70 wt % based on 80 to 10 wt % of the solid content of the ethylene-vinyl acetate copolymer. When the amount of the $\alpha$-olefin copolymer is smaller than about 10 wt %, the improvement of feeling may be small and when the amount is larger than about 50 wt % and the $\alpha$-olefin copolymer is used in combination with the polyurethane, flameproofness may deteriorate disadvantageously. When the amount of the polyurethane is smaller than about 10 wt %, the improvements of feeling and gloss may be small and when the amount is larger than about 70 wt % and the polyurethane is used in combination with the $\alpha$-olefin copolymer, flameproofness may deteriorate disadvantageously.

The flame retardant of the present invention preferably contains red phosphorus in an amount of 1.5 to 15 parts by weight based on 100 parts by weight of the total resin solid content. However, other flame retardants with similar properties can be envisioned and substituted if desired. When the amount of red phosphorus is smaller than about 1.5 parts by weight, its flame retarding effect may be small and when the amount is larger than about 15 parts by weight, the product may have a strong red tint disadvantageously, but otherwise should not materially affect its performance.

Red phosphorus used in the present invention is preferably micro-capsulated. Use of the micro-encapsulated red phosphorus inter alia makes it possible to reduce the increase in the viscosity of an aqueous dispersion when red phosphorus is mixed into the olefin aqueous dispersion. Further, the flameproof mesh sheet is generally detached and washed to remove dirt after it is spread at a construction site and used for 4 to 8 months. It is typically washed by immersing it in hot water heated to about 40° C. and containing a detergent for several hours. At this point, red phosphorus can be prevented from dissolving in water by micro-encapsulation. This is another advantage of using micro-encapsulated red phosphorous. The concentration of red phosphorus is preferably 75 to 95% and the average particle diameter thereof is 10 to 40 μm.

Micro-encapsulation can be suitably carried out by coating the surface of a red phosphorus particle with a resin or inorganic material by techniques known in the art by those of skill, such as by interfacial polymerization, coacervation or the like.

The ammonium polyphosphate compound used in the present invention is ammonium polyphosphate or amide polyphosphate. However, other materials having similar flame retarding properties can also be used. Use of the micro-encapsulated ammonium polyphosphate compound inter alia makes it possible to reduce the increase in the viscosity of the aqueous dispersion when the ammonium polyphosphate compound is mixed into the aqueous dispersion of an olefin resin. Further, the flameproof mesh sheet is generally detached and washed to remove dirt after it is spread at a construction site and used for 4 to 8 months as mentioned above. It is washed by immersing in hot water heated to about 40° C. and containing a detergent. At this point, the ammonium polyphosphate compound is difficult to solubilize in water and can be made more stable by micro-encapsulation. The concentration of phosphorus contained in the ammonium polyphosphate compound is preferably 15 to 35% and the average particle diameter of the compound is preferably 5 to 40 μm. Micro-encapsulation can be carried out like red phosphorus, using known techniques.

The flame retardant of the present invention preferably contains an ammonium polyphosphate compound in an amount of 10 to 70 parts by weight based on 100 parts by weight of the total resin solid content. When the amount of the ammonium polyphosphate compound is smaller than about 10 parts by weight, its flame retarding effect may be small and when the amount is larger than about 70 parts by weight, there may be no further improvement of its flame retarding effect. Therefore, it is generally not necessary to add a large amount of the ammonium polyphosphate compound.

Red phosphorus and an ammonium polyphosphate compound are preferably used as flame retardants in the present invention because when a resin composition containing red phosphorus is brought close to flames, the resin and red phosphorus on the surface first burn and the resin is bonded to oxygen in the air to become carbon dioxide gas, water and carbon. However, other flame retardants can be used if desired. In this case, red phosphorus promotes the carbonization of the ethylene-vinyl acetate copolymer and the α-olefin copolymer and/or polyurethane. Meanwhile, red phosphorus is bonded to oxygen to become an oxide which is further bonded to water to become condensation phosphoric acid. A film made from a mixture of carbon and condensation phosphoric acid formed on the surface of the resin becomes an oxygen impermeable layer on the surface of the resin, suppresses the combustion of the resin and makes the resin flame resistant. Therefore, the ethylene-vinyl acetate copolymer containing a large amount of oxygen is effective in forming condensation red phosphoric acid. Other compounds with similar properties can be substituted for the red phosphorus if desired for any reason.

Red phosphorus should preferably be existent in an amount of 1.5 to 15 parts by weight based on 100 parts by weight of the solid content of the aqueous dispersion of the ethylene-vinyl acetate copolymer having a solid content of 20 to 75 wt %. When the content of red phosphorus is less than about 1.5 parts by weight based on the resin solid content, its flame retarding effect may not be provided and when the content is more than about 15 parts by weight, its flame retarding effect may not be improved, and the resulting flameproof mesh sheet may have a strong red tint and may be difficult to color, even with a pigment.

In this case, when an ammonium polyphosphate compound is existent, it thermally decomposes at the time of combustion and generates nitrogen gas which shuts off oxygen. The ammonium polyphosphate compound promotes the carbonization of the ethylene-vinyl acetate copolymer as a dehydrocarbonizing agent and improves a flame retarding effect while it generates nitrogen-containing gas. Other compounds with similar properties can be substituted for the ammonium polyphosphate if desired for any reason.

In the present invention, the ammonium polyphosphate compound should be existent preferably in an amount of 10 to 70 parts by weight based on 100 parts by weight of the solid content of an aqueous dispersion of an ethylene-vinyl acetate copolymer having a solid content of 20 to 75%. Below about 10 parts by weight, a flame retarding effect may not be provided and above 70 parts by weight, a flame retarding effect may not be improved. When an α-olefin copolymer and a polyurethane are used in combination with the aqueous dispersion of the ethylene-vinyl acetate copolymer, the above amounts of red phosphorus and ammonium polyphosphate are based on 100 parts by weight of the total resin solid content.

Nova Excel 140 or Nova Red 120 (Rin Kagaku Kogyo Co.) is suitably used as red phosphorus. However, other compounds may be used if desired.

TERRAJU-60 or TERRAJU-70 (of Chisso Corp.), or Hostafuram AP462 (Hoechst Co.) is suitably used as the ammonium polyphosphate compound. However, other compounds can be used if desired.

When a metal hydroxide is further used, a great flame retarding effect is obtained advantageously. The metal hydroxide is preferably magnesium hydroxide or aluminum hydroxide which can be used in conjunction with red phosphorus and ammonium polyphosphate to obtain a greater effect. The metal hydroxide should be existent preferably in an amount of 60 to 150 parts by weight based on 100 parts by weight of the polyolefin resin solid content of the aqueous dispersion of the ethylene-vinyl acetate copolymer.

When the amount of the metal hydroxide is smaller than about 60 parts by weight based on the resin solid content its, effect of promoting flame retardancy may be small and when the amount is larger than about 150 parts by weight, the viscosity of the aqueous dispersion of the ethylene-vinyl acetate copolymer may increase disadvantageously.

As the aluminum hydroxide is used is suitably Hijilite H-42M or Hijilite H-43M (Showa Denko K.K.), although others will also work.

As the magnesium hydroxide Kisuma 5 (Kyowa Kagaku Kogyo Co.) can suitably be used, although other magnesium hydroxides can also be used as well.

A description is subsequently given of one embodiment of a flameproof mesh sheet comprising the flame retardant of the present invention.

The multi-filament used in the present invention is preferably at least one multi-filament selected from polyesters, nylons, polypropylene and vinylon. It is preferably a polyester fiber from viewpoints of strength and thermal shrinkage.

A high-strength and lightweight flameproof mesh sheet can be obtained, for example, by controlling the tensile strength of the multi-filament fiber to 6 to 10 g/denier. A flameproof mesh sheet having high toughness and high impact energy absorption at the time of falling can be obtained, for example, by controlling the break elongation of the multi-filament fiber to 14 to 45%.

The multi-filament which is treated with a flame retardant and then woven generally has an equivalent single fineness of 3 to 17 denier, preferably 3 to 12 denier, particularly preferably 4 to 9 denier and a total fineness of 750 to 4,500 denier, preferably 1,000 to 3,500 denier, particularly preferably 1,500 to 3,000 denier.

The multi-filament used in a fabric which is woven and then treated with a flame retardant preferably has an equivalent single fineness of 2 to 13 denier, more preferably 2 to 11 denier, particularly preferably 2.5 to 9 denier and a total fineness of 150 to 2,500 denier, more preferably 200 to 2,000 denier, particularly preferably 250 to 1,500 denier. By controlling tensile strength to 6 to 10 g/denier, a high-strength and lightweight flameproof mesh sheet can be obtained and by controlling break elongation to 14 to 45%, a flameproof mesh sheet having high toughness and high impact energy absorption at the time of falling for example, when the sheet is dropped) can be obtained.

A flameproof mesh sheet which needs to have high strength and toughness can suitably be prepared by paralleling 2 to 4 filament fibers and weaving an imitation gauze out of the fibers with a Dobby weaving machine. A scattering prevention flameproof mesh sheet can suitably be prepared by weaving an imitation gauze out of a single filament fiber with a weaving machine in most cases. A flameproof mesh sheet for houses having a small number of stores may be prepared by leno weaving 1 to 3 filament fibers into a fabric.

The solid content of the flame retardant is preferably used in an amount of 60 to 250 parts by weight based on 100 parts by weight of the multi-filament fiber or fabric. When the solid content of the flame retardant is less than about 60 parts by weight based on 100 parts by weight of the multi-filament fiber or fabric, coating may become nonuniform and the multi-filament fiber or the base of the fabric may become partly exposed, thereby possibly deteriorating the outer appearance and weatherability. Further, flameproofness may also become lower. When the solid content is more than about 250 parts by weight, the weight of the flameproof mesh sheet may increase with the result that handling properties may deteriorate disadvantageously.

One or more of a pigment, dye, ultraviolet absorber, optical stabilizer, antioxidant, diluent, thickening agent, foaming agent, mold preventing agent, algae preventing agent and the like can be used in conjunction with the flame retardant in the present invention by suitably selecting types and amounts thereof.

A description is subsequently given of a suitable process for producing the flameproof mesh sheet of the present invention. When the flameproof mesh sheet of the present invention is produced using a multi-filament fiber, coated yarn prepared by coating the fiber with a flame retardant through a sizing nozzle and gelling by heating is taken up by a winder. This coated yarn taken up by the winder is woven into a fabric by a weaving machine. This fabric is introduced into a heating furnace and heated for non-shifting processing in order to obtain gray cloth. This cloth is cut to a predetermined size, sewed and subjected to non-shifting processing to obtain a halogen-free flameproof mesh sheet.

When the flameproof mesh sheet of the present invention is produced using a fabric, woven cloth can suitably be obtained by weaving the multi-filament fiber with a Dobby weaving machine. After this woven cloth is immersed in a tank filled with a flame retardant for mesh sheets and let pass through the tank, it is dried with an air blower, introduced into a heating furnace and gelled by heating to obtain coated cloth. To increase the amount of the flame retardant coated on the cloth, the cloth can be immersed in and let pass through the tank filled with the flame retardant at least two times to produce coated cloth. The cloth is cut to a predetermined size, sewed and subjected to non-shifting processing to produce a halogen-free flameproof mesh sheet.

EXAMPLES

Example 1

250 parts by weight of the V-200 aqueous dispersion of an ethylene-vinyl acetate copolymer (of Mitsui Petrochemical Industries, Ltd. having a vinyl acetate content of 19% and a solid content of 45%) was injected into a planetary mixer (volume of 25 liters), and then 6 parts by weight of the Nova Excel 140 red phosphorus (of Rin Kagaku Co.), 40 parts by weight of the TERRAJU-60 ammonium polyphosphate (of Chisso Corp.), 0.8 part by weight of the Tinuabin 327 ultraviolet absorber (of Chiba Geigy Co.), 0.8 part by weight of the Irganox 1010 antioxidant (of Chiba Geigy Co.), 1.0 part by weight of the HALS optical stabilizer (of Chiba Geigy Co.) and 1.0 part by weight of titanium oxide were added little by little over a 3-minute interval with stirring. 20 parts by weight of isopropyl alcohol was then added. After addition, these materials were stirred for another 20 minutes. Then, vacuum defoaming was carried out at a reduced pressure of 5 mmHg for about 30 minutes to obtain a flame retardant for mesh sheets having a viscosity of 2,630 cp (a BM type viscometer, rotor V-6, 12 rpm, 25° C.). The flame retardant was charged into a bath, and a polyester multi-filament fiber consisting of 384 filaments and having a total fineness of 1,750 denier, an equivalent single fineness of 4.5 denier, a tensile strength of 8.5 g/denier and a break elongation of 21% was caused to pass through a guide, pinched with a pinch roll, and further pass through a guide roll, the bath of the flame retardant and then a sizing nozzle (diameter of 0.7 mm) to be coated. Thereafter, the obtained strand was heated in a heating furnace at 140° C. and caused to pass through another sizing nozzle (diameter of 0.8 mm) to coat the multi-filament fiber. The strand was further heated in a heating furnace at 180° C. to produce coated yarn of 3,678 denier. The weight ratio of the flame retardant for mesh sheets to the multifilament fiber was 110/100.

Thereafter, the coated yarn was woven into a mesh plain weave fabric of 52 warps/10 cm and 52 wefts/10 cm with a rapier loom at a speed of 50 cm/mm. This fabric was then heated in a heating furnace at 160° C. to thermally fuse intersecting points between the warps and wefts to obtain the flameproof mesh sheet of the present invention. Further, this cloth was cut to a width of 190 cm and a length of 520 cm, sewed with a sewing machine and subjected to non-shifting processing to obtain a flameproof mesh sheet having a width of 180 cm and a length of 510 cm.

The composition of the flame retardant is shown in Table 1 and the measurement results of the properties of the flameproof mesh sheet treated with the flame retardant are shown in Table 3.

Example 2

A flame retardant having a viscosity of 1,650 cp was obtained in the same manner as in Example 1 except that 200 parts by weight of the S-752 ethylene-vinyl acetate copolymer (of Sumitomo Chemical Company, Ltd., having a vinyl acetate content of 90 wt % and a solid content of 50 wt %) was used in place of the V-200 ethylene-vinyl acetate copolymer and isopropyl alcohol was not added.

A multi-filament fiber of 3,000 denier was used to obtain coated yarn of 5,486 denier by using a first sizing nozzle having a diameter of 0.8 mm and a second sizing nozzle having a diameter of 0.9 mm.

A flameproof mesh sheet was obtained in the same manner as in Example 1 except that the coated yarn was formed into 30 warps/10 cm and 30 wefts/10 cm.

The composition of the flame retardant is shown in Table 1 and the measurement results of the properties of the flameproof mesh sheet treated with the flame retardant are shown in Table 3.

Example 3

A flameproof mesh sheet was obtained in the same manner as in Example 1 except that 125 parts by weight of the V-200 ethylene-vinyl acetate copolymer (of Mitsui petrochemical Industries, Ltd., having a vinyl acetate content of 19 wt % and a solid content of 40 wt %) and 125 parts by weight of the A-100 α-olefin copolymer (of Mitsui petrochemical Industries, Ltd., having a solid content of 40 wt %) were used in place of the ethylene-vinyl acetate copolymer.

The composition of the flame retardant is shown in Table 1 and the measurement results of the properties of the flameproof mesh sheet treated with the flame retardant are shown in Table 3.

Example 4

A flameproof mesh sheet was obtained in the same manner as in Example 1 except that 75 parts by weight of the V-200 ethylene-vinyl acetate copolymer (of Mitsui Petrochemical Industries Ltd., having a vinyl acetate content of 19 wt % and a solid content of 40 wt %) and 120 parts by weight of the Despacol U-42 polyurethane (of Sumitomo Viel Urethane Co., having the main structure of a polyester and a solid content of 50 wt %) were used and isopropyl alcohol was not added.

The composition of the flame retardant is shown in Table 1 and the measurement results of the properties of the flameproof mesh sheet treated with the flame retardant are shown in Table 3.

Example 5

A flameproof mesh sheet was obtained in the same manner as in Example 1 except that 100 parts by weight of the V-200 ethylene-vinyl acetate copolymer (of Mitsui petrochemical Industries, Ltd., having a vinyl acetate content of 19 wt % and a solid content of 40 wt %), 75 parts by weight of the A-l00 α-olefin copolymer (of Mitsui petrochemical Industries, Ltd., having a solid content of 40 wt %), and 70 parts by weight of the Adecabontine HUX-380 polyurethane (of Asahi Denka Kogyo Co., having the main structure of a polyester and a solid content of 38 wt %) were used and isopropyl alcohol was not added.

The composition of the flame retardant is shown in Table 1 and the measurement results of the properties of the flameproof mesh sheet treated with the flame retardant are shown in Table 3.

Example 6

A flame retardant for mesh sheets was obtained in the same manner as in Example 1 except that 140 parts by weight of the S-752 ethylene-vinyl acetate copolymer (of Sumitomo Chemical Company, Ltd., having a vinyl acetate content of 90 wt % and a solid content of 50 wt %) was used in place of the V-200 ethylene-vinyl acetate copolymer (of Mitsui petrochemical Industries, Ltd., having a vinyl acetate content of 19 wt % and a solid content of 40 wt %), 79 parts by weight of the Adecabontiter HUX-380 polyurethane (of Asahi Denka Kogyo Co., having the main structure of a polyester and a solid content of 38 wt %) and 2 parts by weight of the HUZ-XW-3 curing agent (of Asahi Denka Kogyo Co.) were added and isopropyl alcohol was not added. The composition of the flame retardant is shown in Table 2.

An imitation gauze fabric of 45 warps/10 cm and 45 wefts/10 cm was woven with a Dobby weaving machine by paralleling 3 multi-filament fibers of 750 denier to coat the fabric and not the multi-filament fibers in Example 1. The weight of the fabric was 225 g/m².

Thereafter, the fabric was caused to pass through a guide roll into a tank filled with the flame retardant, pinched with a pinch roll, pass into the flame retardant in the tank through a guide roll, squeezed with a squeezing roll and dried with an air blow to remove the flame retardant filled in the weave of the fabric, and gelled in a heating furnace having a temperature gradient of 130° C., 160° C. and 170° C., and the coated cloth was taken up by a winder. The coated cloth was caused to pass through a tank filled with the flame retardant and the same procedure was repeated twice to obtain coated cloth having a coating amount of 386 g/m² (mesh sheet cloth). The cloth was cut to a predetermined size, sewed and subjected to non-shifting processing to obtain a flameproof mesh sheet. The properties of the mesh sheet are shown in Table 4.

Example 7

A leno weave fabric of 20 warps/10 cm and 20 wefts/10 cm was woven with a weaving machine by paralleling 3 multi-filament fibers of 750 denier to coat the fabric and not the multi-filament fibers in the same manner as in Example 6. The weight of the coated fabric was 100 g/m².

The fabric was coated with the same flame retardant as in Example 6 in the same manner as in Example 6 and gelled by heating, and the coated cloth having a weight of 172 g/m² was taken up by a winder. This coated cloth was cut to a predetermined size, sewed and subjected to non-shifting processing to obtain a flameproof mesh sheet for houses having a small number of stories.

The composition of the flame retardant used is shown in Table 2 and the measurement results of the properties o the flameproof mesh sheet for houses having a small number of stories treated with the flame retardant are shown in Table 4.

Example 8

An imitation gauze fabric of 120 warps/10 cm and 120 wefts/10 cm was woven with a Dobby weaving machine by using 1 multi-filament fiber of 250 denier to coat the fabric and not the multi-filament fiber in the same manner as in Example 6. The weight of the fabric was 66 g/m².

Thereafter, the fabric was coated with the same flame retardant for mesh sheets as in Example 6 in the same manner as in Example 6 and gelled by heating, and the coated gray cloth having a weight of 112 g/m² was taken up by a winder.

The cloth was cut to a predetermined size, sewed and subjected to non-shifting processing to obtain a scattering prevention flameproof mesh sheet.

The composition of the flame retardant used is shown in Table 2 and the measurement results of the properties of the scattering prevention flameproof mesh sheet treated with the flame retardant are shown in Table 4.

Example 9

A flame retardant for mesh sheets was produced in the same manner as in Example 1 except that 140 parts by weight of the S-706 ethylene-vinyl acetate copolymer (a vinyl acetate content of 80 wt % and a solid content of 50 wt %) was used in place of the V-200 ethylene-vinyl acetate copolymer (a vinyl acetate content of 19 wt % and a solid content of 40 wt %), 100 parts by weight of the Adecabontiter HUX-350 polyurethane (having the main structure of a polyester and a solid content of 30 wt %), 2 parts by weight of the SBU-Isocyanete-0772 curing agent, 3 parts by weight of the Nova Red 120 red phosphorus, 40 parts by weight of the Hostafuram AP-462 ammonium polyphosphate and 100 parts by weight of the Hijilite H-42H ammonium hydroxide were added.

A flameproof mesh sheet was obtained in the same manner as in Example 1 except that the above flame retardant was used.

The composition of the flame retardant is shown in Table 2 and the measurement results of the properties of the flameproof mesh sheet treated with the flame retardant are shown in Table 4.

Example 10

A flame retardant for mesh sheets was produced in the same manner as in Example 1 except that 140 parts by weight of the S-706 ethylene-vinyl acetate copolymer (a vinyl acetate content of 80 wt % and a solid content of 50 wt %) was used in place of the V-200 ethylene-vinyl acetate copolymer (a vinyl acetate content of 19 wt % and a solid content of 40 wt %), 97 parts by weight of the Adecabontiter HUX-386 polyurethane (having the main structure of a polycarbonate and a solid content of 31 wt %), 2 parts by weight of the SBU-Isocyanete0772 curing agent, 12 parts by weight of the Nova Red 120 red phosphorus, 20 parts by weight of the Hostafuram AP-462 ammonium polyphosphate and 100 parts by weight of the Kisuma-5 magnesium hydroxide were added.

The composition of the flame retardant is shown in Table 2 and a flameproof mesh sheet was obtained in the same manner as in Example 1 except that the above flame retardant was used.

The measurement results of the properties of the flameproof mesh sheet treated with the flame retardant are shown in Table 4.

Comparative Example 1

A flame retardant having a viscosity of 2,590 cps was obtained in the same manner as in Example 1 except that the amount of Nova Excel 140 red phosphorus was changed to 1.0 part by weight. A flameproof mesh sheet was produced in the same manner as in Example 1 except that the above flame retardant was used.

The composition of the flame retardant is shown in Table 5 and the measurement results of the properties of the flameproof mesh sheet treated with the flame retardant are shown in Table 6.

Comparative Example 2

A flame retardant having a viscosity of 2,550 cps was obtained in the same manner as in Example 1 except that the amount of the Nova Excel 140 red phosphorus was changed to 12 parts by weight and the amount of TERRAJU-60 ammonium polyphosphate was changed to 8 parts by weight. A flameproof mesh sheet was produced in the same manner as in Example 1 except that the above flame retardant was used.

The composition of the flame retardant is shown in Table 5 and the measurement results of the properties of the flameproof mesh sheet treated with the flame retardant are shown in Table 6.

Comparative Example 3

A flame retardant having a viscosity of 2,850 cps was obtained in the same manner as in Example 1 except that red phosphorus was not used and 25 parts by weight of antimony trioxide was used. A flameproof mesh sheet was produced in the same manner as in Example 1 except that the above flame retardant was used.

The composition of the flame retardant is shown in Table 5 and the measurement results of the properties of the flameproof mesh sheet treated with the flame retardant are shown in Table 6.

Comparative Example 4

A flame retardant having a viscosity of 2,410 cps was obtained in the same manner as in Example 1 except that ammonium polyphosphate was not used and 25 parts by weight of antimony trioxide was used. A flameproof mesh sheet was produced in the same manner as in Example 1 except that the above flame retardant was used.

The composition of the flame retardant is shown in Table 5 and the measurement results of the properties of the flameproof mesh sheet treated with the flame retardant are shown in Table 6.

Comparative Example 5

A flame retardant having a viscosity of 2,440 cps was obtained in the same manner as in Example 1 except that red phosphorus and ammonium polyphosphate were not used, and 25 parts by weight of antimony trioxide and 30 parts by weight of decabromodiphenyl oxide were used. A flameproof mesh sheet was produced in the same manner as in Example 1 except that the above flame retardant was used.

The composition of the flame retardant is shown in Table 5 and the measurement results of the properties of the flameproof mesh sheet treated with the flame retardant are shown in Table 6.

Comparative Example 6

Coated yarn of 2,573 denier was obtained by coating a multi-filament fiber using a 0.6 mm-diameter sizing nozzle in place of a 0.7 mm-diameter sizing nozzle in Example 1. A flameproof mesh sheet was produced in the same manner as in Example 1 except that the coated yarn which was not coated with the flame retardant twice was used.

The composition of the flame retardant is shown in Table 5 and the measurement results of the properties of the flameproof mesh sheet treated with the flame retardant are shown in Table 6.

TABLE 1

|  | Solid content % | Example 1 | Example 2 | Example 3 | Example 4 | Example 5 |
|---|---|---|---|---|---|---|
| Aqueous Dispersion Resin of Ethylene-Vinyl Acetate Copolymer | | | | | | |
| V-200 | 40 | 250 | | 125 | 75 | 100 |
| S-752 | 50 | | 200 | | | |
| S-706 | 50 | | | | | |
| Ethylene-α-olefin copolymer | | | | | | |
| A-100 | 40 | | | 125 | | 75 |
| Polyurethane | | | | | | |
| Despacol U-42 | 50 | | | | 120 | |
| Adecabontiter HUX-380 | 38 | | | | | 79 |
| Adecabontiter HUX-350 | 30 | | | | | |
| Adecabontiter HUX-385 | 31 | | | | | |
| Aqueous dispersion resin | | | | | | |
| solid content (%) | | 100 | 100 | 100 | 100 | 100 |
| HUX-XW-3 curing agent | | — | — | — | — | — |
| SBU-Isocyanete 0772 | | — | — | — | — | — |
| Red phosphorus Nova Excel 140 | | 6 | 6 | 6 | 6 | 6 |
| Red phosphorus Nova Red 120 | | | | | | |
| Ammonium polyphosphate A | | 40 | 40 | 40 | 40 | 40 |
| Ammonium polyphosphate B | | | | | | |
| aluminum hydroxide C | | | | | | |
| aluminum hydroxide D | | | | | | |
| isopropyl alcohol | | 20 | — | 20 | — | — |
| viscosity of flame retardant for mesh sheets (CP) | | 2630 | 1650 | 3170 | 2820 | 1980 |

TABLE 2

|  | Example 6 | Example 7 | Example 8 | Example 9 | Example 10 |
|---|---|---|---|---|---|
| Aqueous Dispersion Resin of Ethylene-Vinyl Acetate Copolymer | | | | | |
| V-200 | | | | | |
| S-752 | 140 | 140 | 140 | | |
| S-706 | | | | 140 | 140 |
| Ethylene-α-olefin copolymer | | | | | |
| A-100 | | | | | |
| Polyurethaue | | | | | |
| Despacol U-42 | | | | | |
| Adecabontiter HUX-380 | 79 | 79 | 79 | | |
| Adecabontiter HUX-350 | | | | 109 | |
| Adecabontiter HUX-385 | | | | | 97 |
| Aqueous dispersion resin | | | | | |
| Solid content (%) | 100 | 100 | 100 | 100 | 100 |
| HUX-XW-3 curing agent | 2 | 2 | 2 | — | — |
| SBU-Isocyanete 0772 | — | — | — | 2 | 2 |
| red phosphorus Nova Excel 140 | 6 | 6 | 6 | | |
| Red phosphorus Nova Red 120 | | | | 3 | 12 |
| Ammonium polyphosphate A | 40 | 40 | 40 | — | — |
| Ammonium polyphosphate B | | | | 40 | 20 |
| Aluminum hydroxide C | | | | 100 | — |
| Aluminum hydroxide D | | | | — | 100 |
| Isopropyl alcohol | — | — | — | 20 | 20 |
| Viscosity of flame retardant for mesh sheets (CP) | 830 | 830 | 830 | 2540 | 2760 |

TABLE 3

| | Solid content % | Example 1 | Example 2 | Example 3 | Example 4 | Example 5 |
|---|---|---|---|---|---|---|
| fineness of multi-filamnet fiber (De) | | 1750 | 3000 | 1750 | 1750 | 1750 |
| fabric number of warps/10 cm | | 52 | 30 | 52 | 52 | 52 |
| Number of wefts/10 cm | | 52 | 30 | 52 | 52 | 52 |
| weight of fabric (g/m$^2$) | | — | — | — | — | — |
| weight of coated fabric (g/m$^2$) | | — | — | — | — | — |
| fineness of coated yarn (De) | | 3678 | 5486 | 5040 | 4263 | 3424 |
| flame retardant for mesh sheets/multi-filament fiber or fabric | | 110/100 | 83/100 | 188/100 | 144/100 | 96/100 |
| Combustion test | | | | | | |
| 1) two minutes or 1 minute of combustion carbonization area (cm$^2$) | | 6 | 8 | 6 | 8 | 8 |
| Afterflame time (seconds) | | 0 | 0 | 0 | 0 | 0 |
| Afterglow time (seconds) | | 0 | 0 | 0 | 0 | 0 |
| 2) 6 seconds or 3 seconds after catching fire carbonization area (cm$^2$) | | 7 | 9 | 8 | 8 | 8 |
| Afterflame time (seconds) | | 0 | 1 | 0 | 1 | 0 |
| Afterglow time (seconds) | | 0 | 2 | 2 | 1 | 1 |
| 3) number of times of flame contact (time) | | 5 | 4 | 5 | 4 | 4 |
| amount of halogen gas (HBr) (mg/g) | | 0 | 0 | 0 | 0 | 0 |
| tensile strength (warp/weft) | | 212/215 | 224/226 | 219/212 | 215/214 | 213/212 |
| tensile elongation (warp/weft) | | 23/24 | 24/25 | 24/23 | 22/24 | 23/25 |
| Toughness (warp/weft) | | 9752/ 10320 | 10752/ 11300 | 10080/ 9752 | 9460/ 10277 | 9798/ 10600 |
| drop impact strength (penetration test) m | | 8 | 8 | 7 | 7 | 7 |

TABLE 4

| | Example 6 | Example 7 | Example 8 | Example 9 | Example 10 |
|---|---|---|---|---|---|
| fineness of multi-filamnet fiber (De) | — | — | — | 1750 | 1750 |
| fabric number of warps/10 cm | 45 | 20 | 120 | 52 | 52 |
| number of wefts/10 cm | 45 | 20 | 120 | 52 | 52 |
| Weight of fabric (g/m$^2$) | 225 | 100 | 66 | — | — |
| Weight of coated fabric (g/m$^2$) | 386 | 172 | 112 | — | — |
| Fineness of coated yarn (De) | — | — | — | 3820 | 4190 |
| flame retardant for mesh sheets/multi-filament fiber or fabric | 74/100 | 72/100 | 70/100 | 118/100 | 139/100 |
| Combustion test | | | | | |
| 1) two minutes or 1 minute of combustion carbonization area (cm$^2$) | 7 | 10 | 11 | 12 | 10 |
| afterflame time (seconds) | 0 | 0 | 0 | 0 | 0 |
| afterglow time (seconds) | 0 | 0 | 0 | 0 | 0 |
| 2) 6 seconds or 3 seconds after catching fire carbonization area (cm$^2$) | 8 | 10 | 11 | 12 | 10 |
| afterflame time (seconds) | 1 | 2 | 1 | 2 | 1 |
| afterglow time (seconds) | 1 | 2 | 2 | 3 | 3 |
| 3) number of times of flame contact (time) | 4 | 4 | 3 | 4 | 4 |
| Amount of halogen gas (HBr) (mg/g) | 0 | 0 | 0 | 0 | 0 |
| Tensile strength (warp/weft) | 215/217 | 93/94 | 62/64 | 213/214 | 214/212 |
| Tensile elongation (warp/weft) | 24/24 | 24/23 | 22/24 | 23/25 | 24/24 |
| Toughness (warp/weft) | 10320/ 10416 | 4464/ 4324 | 2728/ 3072 | 9798/ 10700 | 10272/ 10176 |
| drop impact strength (penetration test) m | 7 | 4 | 2 | 7 | 7 |

TABLE 5

|  | Solid content % | Comparative Example 1 | Comparative Example 2 | Comparative Example 3 | Comparative Example 4 | Comparative Example 5 | Comparative Example 6 |
|---|---|---|---|---|---|---|---|
| Aqueous Dispersion Resin of Ethylene-Vinyl Acetate Copolymer | | | | | | | |
| V-200 | 40 | 250 | 250 | 250 | 250 | 250 | 250 |
| S-752 | 50 | | | | | | |
| S-706 | 50 | | | | | | |
| Ethylene-α-olefin copolymer | | | | | | | |
| A-100 | 40 | | | | | | |
| Polyurethane | | | | | | | |
| Despacol U-42 | 50 | | | | | | |
| Adecabontiter HUX-380 | 38 | | | | | | |
| Adecabontiter HUX-350 | 30 | | | | | | |
| Adecabontiter HUX-385 | 31 | | | | | | |
| aqueous dispersion resin solid content (%) | | 100 | 100 | 100 | 100 | | |
| HUX-XW-3 curing agent | | | | | | | |
| SBU-Isocyanete 0772 | | | | | | | |
| red phosphors Nova Excel 140 | | 1 | 12 | — | 6 | — | 6 |
| Red phosphorus Nova Red 120 | | | | | | | |
| Ammonium polyphosphate A | | 40 | 8 | 40 | — | — | 40 |
| Ammonium polyphosphate B | | | | | | | |
| aluminum hydroxide C | | | | | | | |
| aluminum hydroxide D | | | | | | | |
| isopropyl alcohol | | | | | | 30 | |
| Decabromodiphenyl | | — | — | 25 | 25 | 25 | — |
| antimony trioxide | | 20 | 20 | 20 | 20 | 20 | 20 |
| viscosity of flame retardant for mesh sheets (CP) | | 2590 | 2550 | 2850 | 2410 | 2440 | 2630 |

TABLE 6

|  | Solid content % | Comparative Example 1 | Comparative Example 2 | Comparative Example 3 | Comparative Example 4 | Comparative Example 5 | Comparative Example 6 |
|---|---|---|---|---|---|---|---|
| fineness of multi-filamnet fiber (De) | | 1750 | 1750 | 1750 | 1750 | 1750 | 1750 |
| fabric number of warps/10 cm | | 52 | 52 | 52 | 52 | 52 | 52 |
| Number of wefts/10 cm | | 52 | 52 | 52 | 52 | 52 | 52 |
| weight of fabric (g/m$^2$) | | — | — | — | — | — | — |
| weight of coated fabric (g/m$^2$) | | — | — | — | — | — | — |
| fineness of coated yam (De) | | 3616 | 3532 | 4058 | 4027 | 4146 | 2573 |
| flame retardant for mesh sheets/multi-filament fiber or fabric | | 107/100 | 102/100 | 132/100 | 130/100 | 137/100 | 47/100 |
| Combustion test | | | | | | | |
| 1) two minutes or 1 minute of combustion carbonization area (cm$^2$) | | totally burnt | totally burnt | Totally burnt | totally burnt | 7 | totally burnt |
| Afterflame time (seconds) | | — | — | — | — | 0 | — |
| Afterglow time (seconds) | | — | — | — | — | 0 | — |
| 2) 6 seconds or 3 seconds after catching fire carbonization area (cm$^2$) | | totally burnt | totally burnt | Totally burnt | totally burnt | 8 | totally burnt |
| Afterflame time (seconds) | | — | — | — | — | 0 | — |
| Afterglow time (seconds) | | — | — | — | — | 0 | — |
| 3) number of times of flame contact (time) | | — | — | — | — | 4 | — |
| Amount of halogen gas (HBr) (mg/g) | | 0 | 0 | 0 | 0 | 35 | 0 |
| Tensile strength (warp/weft) | | 213/214 | 212/212 | 214/215 | 213/214 | 214/213 | 213/214 |
| Tensile elongation (warp/weft) | | 23/24 | 24/25 | 24/23 | 24/24 | 23/23 | 24/25 |
| Toughness (warp/weft) | | 9798/10272 | 10176/10600 | 10272/9890 | 10224/10272 | 10272/9798 | 10224/10700 |
| Drop impact strength (penetration test) m | | — | — | — | — | 7 | — |

(1) The amount of each material is expressed parts by weight based on 100 parts by weight of a resin solid content.

(2) The unit of numerical values of the coated fabrics of Examples 6, 7 and 8 is g/m².

(3) The fineness of a multi-filament fiber x the number of the fibers in Examples 6, 7 and 8 are 750×3, 750×3 and 250×1, respectively.

(4) The combustion tests of Examples 1, 5, 6, 7, 8 and 9 and Comparative Examples 1, 2 and 6 were based on A-1 method in which heating was carried out for 1 minute and flames were produced after 3 seconds.

(5) A is TERRAJU-60 (of Chisso Corp.).

(6) B is Hostafuram AP 462 (of Hoechst Japan Limited).

(7) C is Hijilite H-42M (of Showa Denko Co.).

(8) D is Kisuma-5 (of Kyowa Kagaku Co.).

(9) The figures in the column of the fineness (De) of the coated yarn and the coated fabric are for coated fabrics in Examples 6, 7 and 8 and coated yarn in other examples.

measurement methods of properties 1. viscosity measurement method BM type viscometer rotor No. 6, revolution of 12 rpm, 25° C.

2. combustion test measured in accordance with JIS L-1091 A-1 method (45° C., micro-burner method) A-2 method (45° C., meckel burner method) D method (number of times of flame contact)

3. tensile strength test measured in accordance with JIS L-1068

4. amount of HBr gas generated 0.5 g of a sample was taken. This sample was placed in a combustion tube, preheated at 350 to 400° C. for 5 minutes and postheated at 800±30° C. for 30 minutes, and a combustion gas was collected into a flask filled with a 1/10 N NaOH solution. The quantity of HBr contained in the solution was determined by ion chromatography.

5. drop impact strength (penetration test) measured in accordance with JIS-8952.

A steel tube having an outer diameter of 48.6 mm, a thickness of 2.5 mm and a weight of 2.7 kg was used in this test in the case of a flameproof mesh sheet for houses having a small number of stories and scattering prevention flameproof mesh sheet.

The flameproof mesh sheet of the present invention does not generate harmful halogen gas at the time of combustion and is excellent in flame retardancy and satisfactory in terms of drop impact strength.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The priority document, JP-9-312550 filed Oct. 10, 1997 is incorporated by reference in its entirety.

As used herein, singular terms such as, "a", "an" and "the" can refer to the singular or plural form of the object which follows.

The specifications, material safety data sheets and product literature for all commercially available materials listed herein are incorporated herein by reference.

The specifications for test protocols, such as ASTM, JIS, etc. listed herein are incorporated by reference in their entirety.

We claim:

1. A halogen-free flame retardant for mesh sheets comprising:

an aqueous dispersion of an ethylene-vinyl acetate copolymer having a vinyl acetate content of 10 to 95 wt % and a resin solid content of 25 to 75 wt %; and red phosphorus in an amount of 1.5 to 15 parts by weight and an ammonium polyphosphate compound in an amount of 10 to 70 parts by weight based on 100 parts by weight of the solid content of said aqueous dispersion.

2. A halogen-free flame retardant for mesh sheets of claim 1, wherein said red phosphorus is micro-capsulated.

3. A halogen-free flame retardant for mesh sheet of claim 1, wherein said ammonium polyphosphate compound is micro-capsulated.

4. A halogen-free flame retardant for mesh sheets prepared by:

mixing an aqueous dispersion of an α-olefin copolymer having a solid content of 20 to 45 wt % with an aqueous dispersion of an ethylene-vinyl acetate copolymer having a vinyl acetate content of 10 to 95 wt % and a resin solid content of 25 to 75 wt % in a solid content weight ratio of 10:90 to 70:30; and adding red phosphorus in an amount of 1.5 to 15 parts by weight and an ammonium polyphosphate compound in an amount of 10 to 70 parts by weight based on 100 parts by weight of the total resin solid content.

5. A halogen-free flame retardant for mesh sheets according to claim 4, further comprising mixing a metal hydroxide in an amount of 60 to 150 parts by weight based on 100 parts by weight of the total solid content of the aqueous dispersion resins.

6. A halogen-free flame retardant for mesh sheet of claim 5, wherein the metal hydroxide is magnesium hydroxide and/or aluminum hydroxide.

7. A halogen-free flame retardant for mesh sheets prepared by:

mixing an aqueous dispersion of a polyurethane having a solid content of 25 to 70 wt % with an aqueous dispersion of an ethylene-vinyl acetate copolymer having a vinyl acetate content of 10 to 95 wt % and a resin solid content of 25 to 75 wt % in a solid content weight ratio of 10:90 to 90:10; and adding red phosphorus in an amount of 1.5 to 15 parts by weight and an ammonium polyphosphate compound in an amount of 10 to 70 parts by weight based on 100 parts by weight of the total resin solid content.

8. A halogen-free flame retardant for mesh sheets prepared by:

mixing an aqueous dispersion of an α-olefin copolymer having a solid content of 20 to 45 wt % and an aqueous dispersion of a polyurethane having a solid content of 25 to 70 wt % with an aqueous dispersion of an ethylene-vinyl acetate copolymer having a vinyl acetate content of 10 to 95 wt % and a resin solid content of 25 to 75 wt % in a solid content weight ratio of 10:10:80 to 50:80:10; and adding red phosphorus in an amount of 1.5 to 15 parts by weight and an ammonium polyphosphate compound in an amount of 10 to 70 parts by weight based on 100 parts by weight of the total resin solid content.

* * * * *